United States Patent Office 3,480,516
Patented Nov. 25, 1969

3,480,516
SEPARATION OF NITROALKANES AND ALKANES BY CODISTILLING WITH METHANOL
John B. Tindall, Terre Haute, Ind., assignor to Commercial Solvents Corporation, New York, N.Y., a corporation of Maryland
No Drawing. Filed Aug. 26, 1968, Ser. No. 755,437
Int. Cl. B01d 3/14; C07c 79/14
U.S. Cl. 203—66                    5 Claims

ABSTRACT OF THE DISCLOSURE

A process for the separation of a mixture of one or more nitroalkanes and an alkane having 5–9 carbon atoms by adding methanol to the mixture, codistilling to remove the methanol and alkane, and fractionating to remove excess methanol from the nitroalkane residue.

BACKGROUND OF THE INVENTION

This invention relates to a method for the separation of a mixture of one or more nitroalkanes and an alkane. In a particular aspect, this invention relates to a method of separating a mixture of nitroalkanes and an alkane by codistillation of the alkane with methanol.

It is known to separate nitroethane and higher molecular weight nitroalkanes by codistillation with an alkane of 5–9 carbon atoms. After removal of most or all of the nitroethane, the higher nitroalkanes mixed with excess alkane are obtained as a residue. Because large volumes may be involved, it is desirable to separate them. However because they are miscible and form azeotropes, they cannot be separated by distillation; consequently, separation of this mixture has heretofore been impractical.

SUMMARY OF THE INVENTION

It is an object of this invention to provide a method for separation of a mixture of one or more nitroalkanes and an alkane.

It is another object of this invention to provide a method for separating nitroalkanes and an alkane by codistillation of the alkane with methanol.

Other objects will be apparent to those skilled in the art from the disclosure herein.

A process has been discovered for the separation of a mixture of nitroalkanes having from 2 to 4 carbon atoms and an alkane having from 5 to 9 carbon atoms, including mixtures thereof, comprising the steps of adding methanol to the mixture, heating to effect codistillation of the methanol and alkane, and condensing the methanol-alkane distillate thereby forming an upper and a lower layer. The upper layer is principally alkane which is withdrawn, and the lower layer is principally methanol which is returned to the distillation unit. When all of the alkane has been removed, the methanol is separated from the nitroalkane by conventional fractional distillation leaving a residue of high purity nitroalkane or mixture of nitroalkanes.

DETAILED DISCUSSION

According to the process of this invention, the nitroalkane-alkane mixture is mixed with sufficient methanol to effect initiation of codistillation of the methanol with the alkane when the mixture is heated, e.g. from about 0.5 to about 1.0 parts by volume of methanol per part of alkane. Distillation of the mixture is conducted under distillation conditions in a distillation unit equipped with a distillation column, a condenser and, conveniently, a decanter head.

The condensed distillate, consisting of methanol and alkane, is collected at total take-off, e.g. in the decanter head, whereupon it divides into 2 layers. The upper layer consists of the alkane plus a few percent of methanol, and the lower layer consists principally of methanol which is returned to the distillation unit until alkane is no longer coming over in the distillate. The temperature rises to approximately that of methanol and distillation is continued at a suitable reflux ratio, generally about 1:1, to separate the methanol from the nitroalkane. After the methanol fractionation is complete, the pot residue is substantially pure nitroalkane or mixture thereof.

The alkane layer is suitable for re-use without further treatment or it can be readily freed from methanol by distilling off the small amount present. Alternatively the alkane layer can be conveniently washed with water to free it from methanol.

The term codistill is intended to mean the phenomenon whereby two or more materials vaporize from the application of heat to a mixture containing them. With reference to the present invention, the term codistillation is intended to include, but not be limited to, azeotropic distillation.

It is contemplated that the process of the present invention will be employed with the nitroalkane-alkane residue from the nitroethane purification process, but it is apparent that the process is suitable for any mixture containing nitroalkanes of 2–3 or more carbon atoms and any alkane which forms an azeotrope with methanol. Such nitroalkanes include nitroethane, 2-nitropropane, 1-nitropropane, 1-nitrobutane, and 2-nitrobutane. Alkanes likely to be encountered are those having from 5–9 carbon atoms, including, but not limited to, n-pentane, isopentane, n-hexane, cyclohexane, n-nonane, or mixtures thereof. In the preferred process, the alkane is heptane or the isooctane isomers, i.e. 2,3,4- and 2,2,4-trimethylpentane or mixtures thereof. n-Heptane is the alkane which will be most frequently encountered.

The methanol used in the practice of this invention is ordinary commercial grade methanol.

The process has been described in terms of batch distillations, but it will be readily apparent to those skilled in the art that the process can be easily adapted to continuous operation.

Generally, the process will be operated at atmospheric pressure, but it is operable at reduced pressures and correspondingly reduced temperatures. Such operation is deemed to be the equivalent of that at atmospheric pressure.

The following examples further illustrate the practice of this invention but it is not intended that the process be limited thereby.

EXAMPLE 1

A mixture consisting of 25 ml. of 2-nitropropane and 110 ml. of heptane was received from the nitroethane purification process. To it was added 125 ml. of methanol and the entire mixture was distilled through a ¾" x 38" column packed with 0.16" protruded stainless steel, equivalent to about 25 theoretical plates. The column was equipped with a condenser and a decanter. The distillate collected in the decanter and divided into 2 layers. The upper layer was withdrawn and the lower layer was returned to the distillation unit. During the distillation, the vapor temperature was 59° C. until all heptane was separated, then it rose to 64° C. and upper layer stopped separating. The upper layer had a volume of 111 ml. and after washing with 125 ml. of water, the volume was 110 ml. The residue, 103 g., consisted of 22% of 2-nitropropane and 78% methanol.

Distillation is continued at 1:1 reflux ratio until all methanol is separated leaving substantially pure 2-nitropropane as the residue.

EXAMPLE 2

A mixture, 240 g., containing isooctanes 78% (2,3,4-trimethylpentane and 2,2,4-trimethylpentane), 2-nitropropane 14% and nitroethane 7% was mixed with 150 ml. of methanol. The complete mixture was distilled through a ¾" x 47" column packed with ⅛" single-turn glass helices having an estimated equivalent of about 17 theoretical plates. The column was equipped with a condenser and a decanter set to take off the upper (alkane) layer and return the lower. During most of the distillation the vapor temperature was 60° C. but it finally rose to 64° C. and the upper layer stopped separating.

The upper layer, 185 g., contained 96% isooctanes and 4% methanol, which was extracted by washing with water. The residue consisted of 2-nitropropane 22%, isooctanes 1%, nitroethane 11.6% and the remainder methanol.

Distillation of the residue is continued until all methanol is separated. The remaining nitropropane-nitroethane mixture is separated by fractionation.

I claim:
1. A process for the separation of a mixture of one or more nitroalkanes having 2 to 3 carbon atoms and an alkane having from 5 to 9 carbon atoms, or a mixture thereof, comprising the steps of:
   (a) adding methanol to said mixture in an amount sufficient to initiate co-distillation with said alkane when said mixture is heated,
   (b) heating and co-distilling said alkane-methanol thereby effecting separation of said alkane and producing a residue of said nitroalkanes and methanol,
   (c) separating said methanol from said nitroalkanes by fractionation.
2. The process of claim 1 wherein said alkane is heptane, 2,2,4-trimethylpentane or 2,3,4-trimethylpentane.
3. The process of claim 1 wherein said nitroalkane is 2-nitropropane.
4. The process of claim 1 wherein said nitroalkane is a mixture of nitroethane and 2-nitropropane.
5. The process of claim 1 wherein said methanol is added to said mixture in a ratio of from about 0.5 to about 1.0 part by volume per part of said alkane.

References Cited
UNITED STATES PATENTS

| | | | |
|---|---|---|---|
| 2,368,050 | 1/1945 | Tooke | 203—66 |
| 2,465,959 | 3/1949 | Tindall | 203—70 |
| 2,597,027 | 5/1952 | Passino et al. | 260—644 |
| 3,211,630 | 10/1965 | Tindall | 260—644 |

WILBUR L. BASCOMB, Primary Examiner

U.S. Cl. X.R.

203—71; 260—644